US007046965B2

(12) United States Patent
Maeda et al.

(10) Patent No.: US 7,046,965 B2

(45) Date of Patent: May 16, 2006

(54) RADIO RECEIVER AND RECEIVING METHOD FOR CONTROLLING THE BEAM-WIDTH OF AN ANTENNA

(75) Inventors: Koji Maeda, Yokosuka (JP); Yuji Aburakawa, Yokohama (JP); Toru Otsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 523 days.

(21) Appl. No.: 10/366,346

(22) Filed: Feb. 14, 2003

(65) Prior Publication Data

US 2003/0157897 A1 Aug. 21, 2003

(30) Foreign Application Priority Data

Feb. 15, 2002 (JP) ............................. 2002-039236

(51) Int. Cl.
*H04B 17/00* (2006.01)

(52) U.S. Cl. ................... 455/67.13; 370/335; 370/342; 342/372; 342/373; 342/367; 455/561; 455/501; 455/67.16; 455/114.2; 455/296; 455/562.1

(58) Field of Classification Search ................ 455/501, 455/67.11, 67.16, 561, 562.1, 63.1, 101, 114.2, 455/296, 295; 342/372, 367, 373
See application file for complete search history.

(56) References Cited

U.S. PATENT DOCUMENTS

| | | | | |
|---|---|---|---|---|
| 4,780,721 | A * | 10/1988 | Dobson | 342/178 |
| 6,009,124 | A | 12/1999 | Smith et al. | |
| 6,229,481 | B1 | 5/2001 | Katz | |
| 6,249,250 | B1 * | 6/2001 | Namekata et al. | 342/372 |
| 6,385,181 | B1 * | 5/2002 | Tsutsui et al. | 370/335 |
| 6,400,317 | B1 * | 6/2002 | Rouphael et al. | 342/367 |
| 6,453,177 | B1 * | 9/2002 | Wong et al. | 455/562.1 |
| 6,694,147 | B1 * | 2/2004 | Viswanath et al. | 455/517 |
| 6,728,554 | B1 * | 4/2004 | Wegner | 455/562.1 |
| 6,792,290 | B1 * | 9/2004 | Proctor et al. | 455/562.1 |
| 6,895,258 | B1 * | 5/2005 | Scherzer et al. | 455/562.1 |
| 2002/0002065 | A1 | 1/2002 | Mesecher et al. | |

FOREIGN PATENT DOCUMENTS

| | | |
|---|---|---|
| EP | 1 047 216 | 10/2000 |
| EP | 1 168 659 | 1/2002 |
| JP | 60-103 | 1/1985 |
| KR | 2000-0077064 | 12/2000 |

OTHER PUBLICATIONS

Patent Abstracts of Japan, JP 2000-349698, Dec. 15, 2000.

* cited by examiner

*Primary Examiner*—Marceau Milord
(74) *Attorney, Agent, or Firm*—Oblon, Spivak, McClelland, Maier & Neustadt, P.C.

(57) ABSTRACT

A radio receiver is provided with a beam-width-variable antenna that receives a radio signal and is capable of changing the beam-width; an interference canceler for removing interference waves from the received radio signal and outputting an interference-wave-removed signal; a measuring device for measuring reception quality of the received signal based on the interference-wave-removed signal; and a beam-width controller for controlling the beam-width of the beam-width-variable antenna based on the reception quality from the measuring device.

14 Claims, 8 Drawing Sheets

RADIO RECEIVER AND RECEIVING METHOD FOR CONTROLLING THE BEAM-WIDTH OF AN ANTENNA

BACKGROUND OF THE INVENTION

1. Field of the Invention

The present invention generally relates to radio receivers and receiving methods, and specifically relates to a radio receiver and receiving method for controlling the beam-width of a beam-width-variable antenna based on reception quality determined by such as carrier-to-interference ratio.

2. Description of the Related Art

In a mobile communication system such as cellular phone system, it is necessary to establish a radio entrance network connecting a plurality of base stations. One example of such radio communication system is shown in FIG. 1.

Referring to FIG. 1, each radio zone 1 is established by a base station 2 having antennas 4 with directivities 3. The directive antennas 4 establish a radio entrance network connecting base stations 2 (shown by bold arrows in FIG. 1). In this entrance network between radio stations, the antennas 4 receive not only the desired direct wave from a communicating base station, but also interference waves such as undesired waves from other base stations out of communication, or reflective waves reflected by buildings, etc. In order to improve reception quality, it is necessary to reduce the influence of interference waves, and therefore the following prior methods are known.

Referring to FIG. 2, a schematic view of circular aperture antennas is shown. These kinds of circular aperture antennas are frequently utilized in a conventional entrance network. As shown in FIG. 2, interference waves 6 in addition to a desired wave 5 come into the antennas. A beam pattern 8 or lobe shows the direction of maximum radiated power. Under condition that the interference waves 6 degrade desired wave power to interference wave power ratio or carrier-to interference power ratio (CIR), it is known to widen the antenna diameter 7 as shown in the right antenna in FIG. 2, in order to narrow the beam-width 8 of the antenna to reduce the influence of the interference waves. Among the same strength radio waves coming into the antenna from different directions, the radio wave coming along the central line of the directivity is received the most strongly, and oblique incident radio waves are received weakly, as represented by the figure of the lobe 8. In this specification, a beam-width or directivity angle means the angular separation between two directions in which radiation power is identical and is half (3 dB reduction) of the maximum power at the center. The wider the beam-width the lower the gain of the antenna is, normally.

An adaptive antenna shown in FIG. 3 is known as another technique for reducing the influence of interference waves. An adaptive antenna 9 can adaptively change its antenna beam pattern 10 in response to the reception spatial environment, to reduce the influence of interference waves. In order to improve its receiving characteristics, the adaptive antenna 9 directs the null (significantly lower gain) to the direction in which an interference wave 6 comes.

Further, a time and space equalizer is obtained by combining temporal signal processing to an adaptive array antenna. By performing temporal/spatial signal processing, it is possible to reduce the influence of a delayed wave 7 coming from the same direction as the one from which the desired wave 5 comes.

As another interference reduction technique, an interference canceler as shown in FIG. 4 is known. In the interference canceler shown in FIG. 4, a propagation path is estimated based on a received signal 44 and an estimated error of the past propagation path, and the estimated propagation path is used for generating a replica 47 for an interference wave 46. By subtracting the interference wave replica 47 from the received signal 44, carrier 48 to interference 49 power ratio (CIR) can be improved.

Among the above referenced prior interference reduction methods, the circular aperture antenna can reduce interference by enlarging its antenna diameter, but has a shortcoming in that it needs a physically wide area. The circular aperture antenna cannot meet a requirement for a broadened beam-width, especially when interference influence is insignificant and more than two communication links need to be voluntarily established for a plurality of base stations. The antenna itself has to be replaced when changing beam-widths. When making an additional line, an additional antenna has to be physically built. Further, there is another defect in that the interferences increase due to the additional lines, and therefore antennas for other lines should also be replaced.

According to the above interference reduction techniques using the adaptive array antenna, it is possible to change the directivity direction and beam-width and increase the number of lines, and therefore deal with newly added interferences. However, there are difficulties in constructing a complex system and performing increased calculating operations.

Further, the above mentioned circular aperture antenna and adaptive array antenna have physical and technical limitations regarding narrowing the beam-width thereof, and a defect that interference waves coming from the same direction as the desired wave cannot be cancelled.

According to the above mentioned interference canceller, it is theoretically possible to cancel all interference waves. However, since one additional interference wave needs one additional replica generation circuit, as the number of interference waves increases, the circuit size and calculation amount increase exponentially, resulting in difficulty of realizing the whole processing system.

SUMMARY OF THE INVENTION

Accordingly, it is one object of the present invention to provide a radio receiver and receiving method that can suppress the influence of interference waves with a small size circuit and a small amount of calculation.

Another and more specific object of the present invention is to provide a radio receiver comprising a beam-width-variable antenna that receives a radio signal and is capable of changing a beam-width thereof; an interference canceller for removing interference waves from the received radio signal and outputting an interference-wave-removed signal; a measuring device for measuring reception quality of the received signal based on the interference-wave-removed signal; and a beam-width controller for controlling the beam-width of the beam-width-variable antenna based on the reception quality from the measuring device.

In addition, in such a radio receiver, the reception quality may be determined by a carrier-to-interference ratio (CIR). Alternatively the reception quality may be determined by a received-signal-to-interference ratio.

The beam-width controller may narrow the beam-width of the antenna when the reception quality is lower than a predetermined threshold. The beam-width controller may broaden the beam-width of the antenna when the reception quality is higher than a predetermined threshold. Alternatively, the beam-width controller may narrow the beam-width of the antenna when the reception quality is lower than a first predetermined threshold, and may broaden the beam-width of the antenna when the reception quality is higher than a second predetermined threshold that is larger than the first predetermined threshold.

Still another object of the present invention is to provide a base station having the above mentioned radio receiver, which base station may be capable of communicating with a plurality of other radio stations at the same time.

Still another object of the present invention is to provide a mobile communication system having a plurality of the above mentioned base stations and capable of establishing a radio entrance network between the base stations.

Still another object of the present invention is to provide a radio receiving method, comprising the steps of receiving a radio signal using a beam-width-variable antenna capable of changing a beam-width thereof; removing interference waves from the received radio signal and outputting an interference-wave-removed signal; measuring reception quality of the received signal based on the interference-wave-removed signal; and controlling the beam-width of the beam-width-variable antenna based on the measured reception quality.

In addition, in such a radio receiving method the reception quality may be determined by a carrier-to-interference ratio (CIR), or the reception quality may be determined by a received-signal-to-interference ratio.

The controlling step may narrow the beam-width of the antenna when the reception quality is lower than a predetermined threshold. The controlling step may broaden the beam-width of the antenna when the reception quality is higher than a predetermined threshold. Further, the controlling step may narrow the beam-width of the antenna when the reception quality is lower than a first predetermined threshold, and may broaden the beam-width of the antenna when the reception quality is higher than a second predetermined threshold that is larger than the first predetermined threshold.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by an apparatus particularly pointed out in the specification in such full, clear, concise, and exact terms as to enable a person having ordinary skill in the art to practice the invention.

DESCRIPTION OF THE PREFERRED EMBODIMENTS

In the following, embodiments of the present invention will be described with reference to the accompanying drawings.

Figure 5:
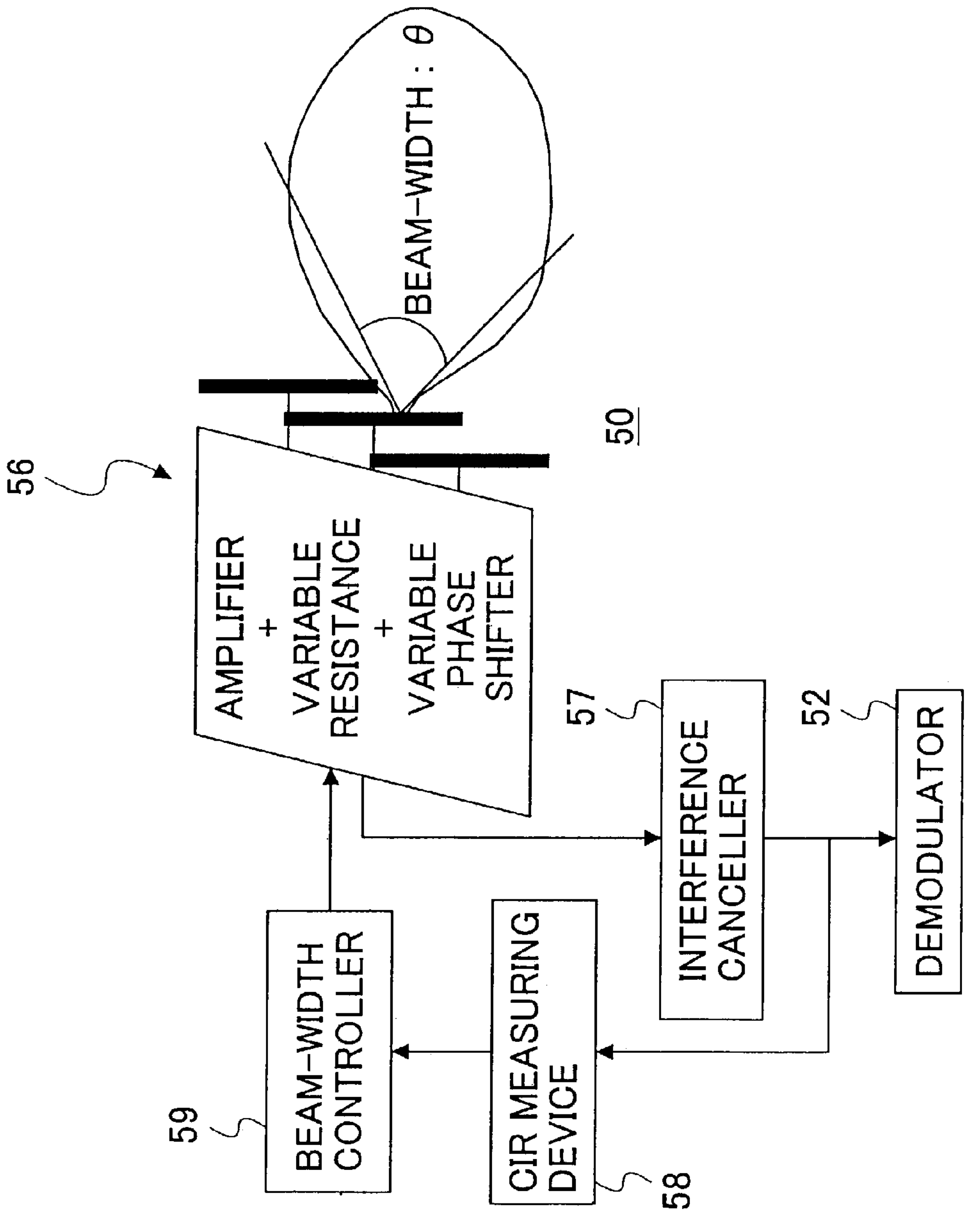
FIG. 5 is a schematic block diagram of a radio receiver having a phased-array antenna in accordance with an embodiment of the present invention.

FIG. 5 shows a block diagram of a radio receiver 50 according to an embodiment of the present invention. A beam-width-variable antenna 56 may be preferably a phased-array antenna consisting of a plurality of radiating elements. The beam direction or radiation pattern of the phased-array antenna is controlled primarily by the relative phases of the excitation coefficients of the radiating elements. The phased-array antenna does not perform sophisticated operation or control such as steering null in the direction of interference wave, unlike an adaptive-array antenna. The phased-array antenna only controls the direction of directivity and beam-width, and therefore has an excellent advantage that processing amount is small. A beam-width-variable antenna generally can vary not only its direction of directivity but also its beam-width. The present invention can employ any antenna that can vary its beam-width.

Figure 1:
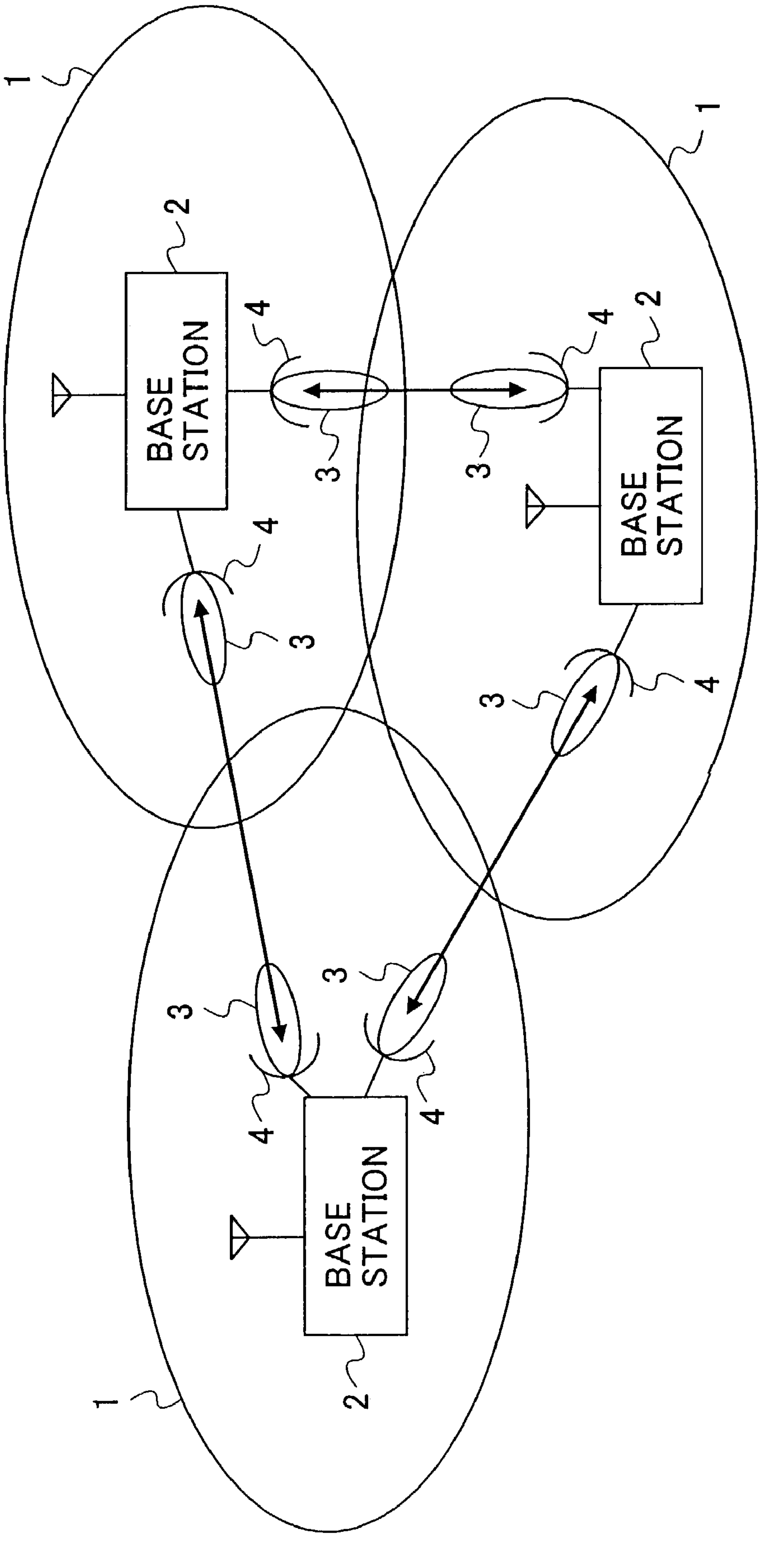
FIG. 1 shows a pictorial view illustrating a radio entrance network to which the present invention can be applied.
Figure 2:
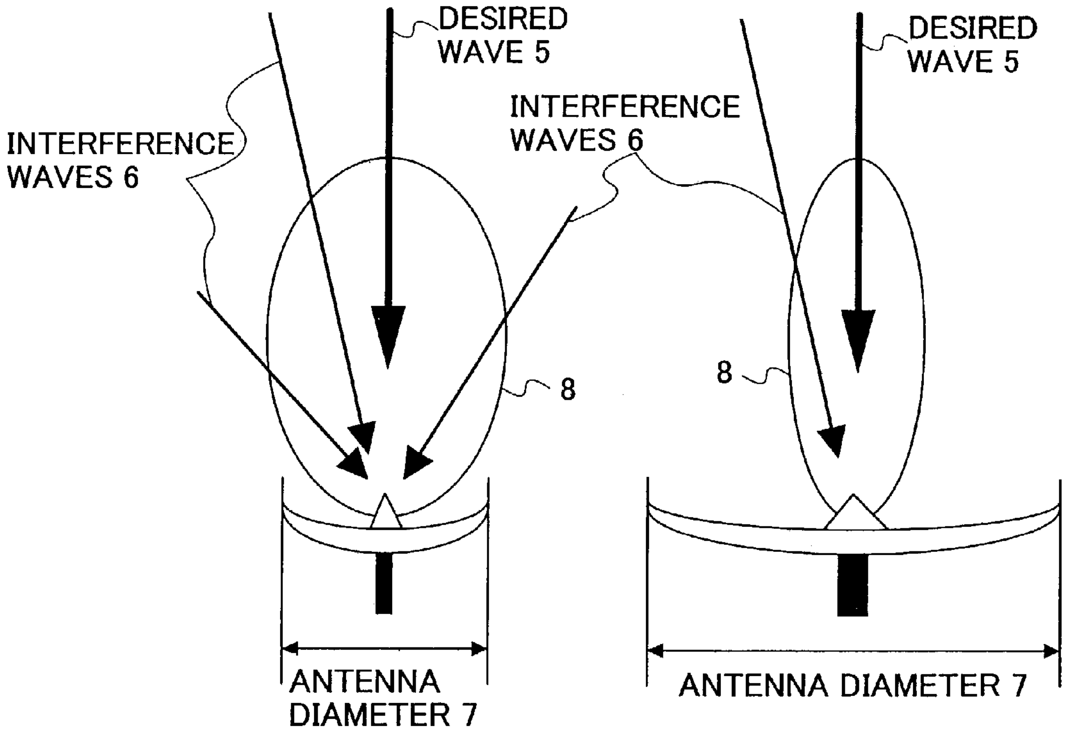
FIG. 2 is a schematic view of circular aperture antennas showing interference wave reduction in prior art.
Figure 3:
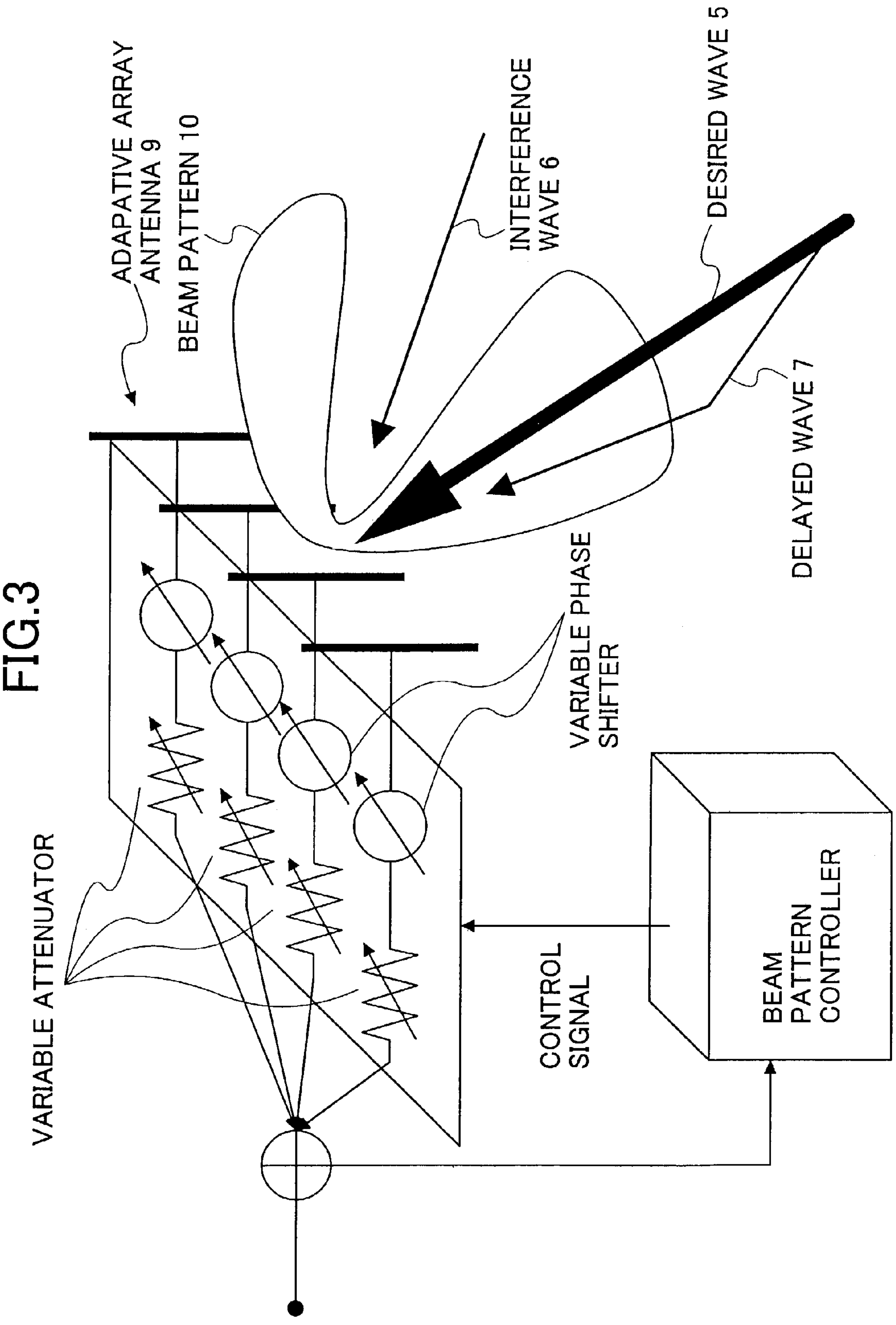
FIG. 3 is a schematic view of an adaptive array antenna showing interference wave reduction in prior art.
Figure 4:
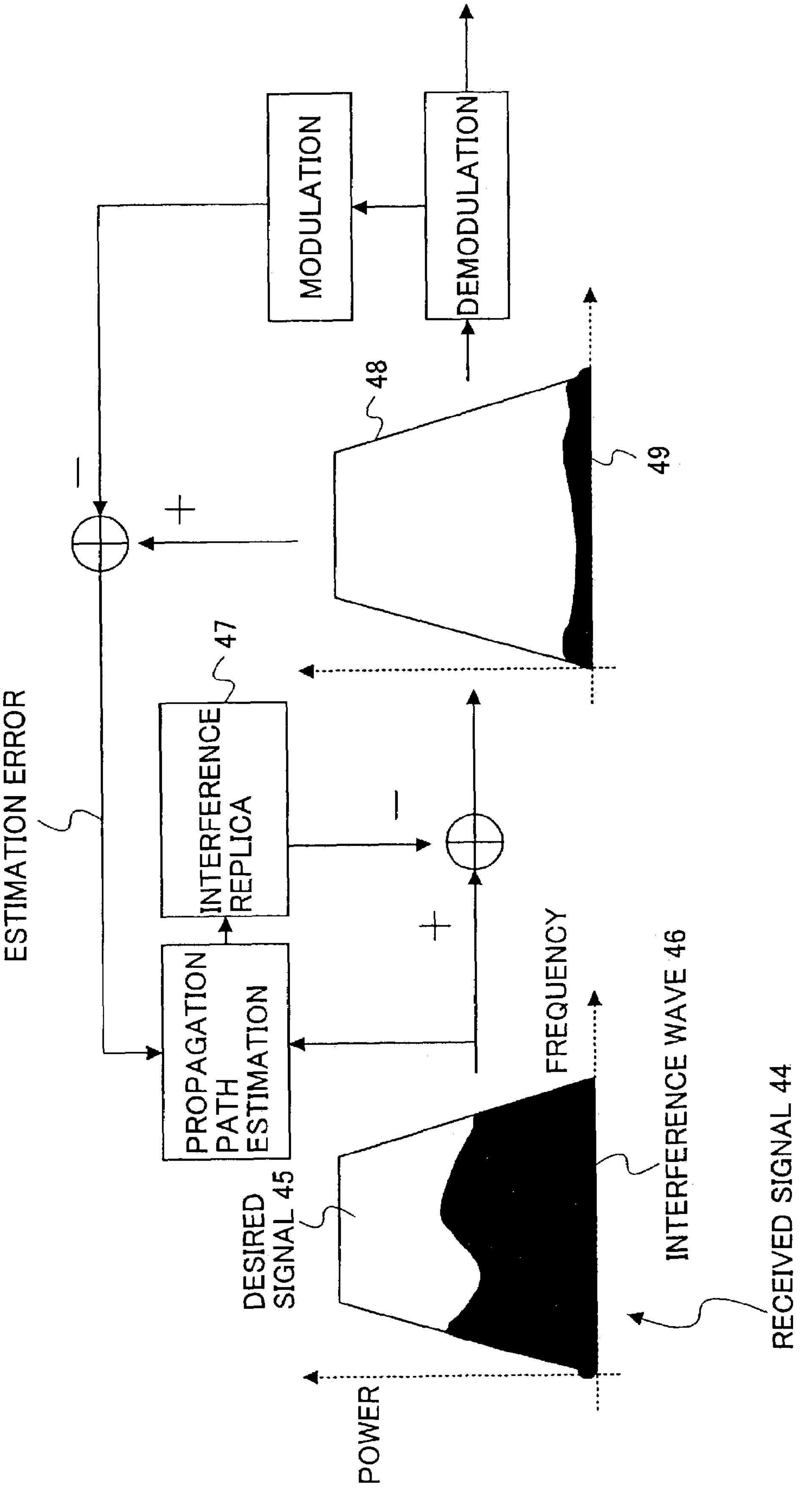
FIG. 4 is a schematic block diagram of an interference canceller showing interference wave reduction in prior art.

An interference canceller 57 similar to the one shown in FIG. 4 is connected to the phased-array antenna 56 to obtain a received signal from the antenna 56. As explained above with reference to FIG. 4, the interference canceller 57 cancels or removes interference waves from the received signal. An interference-wave-removed signal from the interference canceller 57 is supplied to a demodulator 52 and a carrier-to-interference power ratio (CIR) measuring device 58. The demodulator 52 demodulates the interference-wave-removed signal and performs desired communication operation.

The CIR measuring device 58 calculates the CIR of the received interference-wave-removed signal, and outputs the calculated CIR value (e.g. dB value) to a beam-width controller 59. The beam-width controller 59 controls the beam-width of the antenna 56 depending on the CIR value received from the CIR measuring device 58. Methods of controlling the beam-width of the antenna 56 will be explained below.

Figure 6:
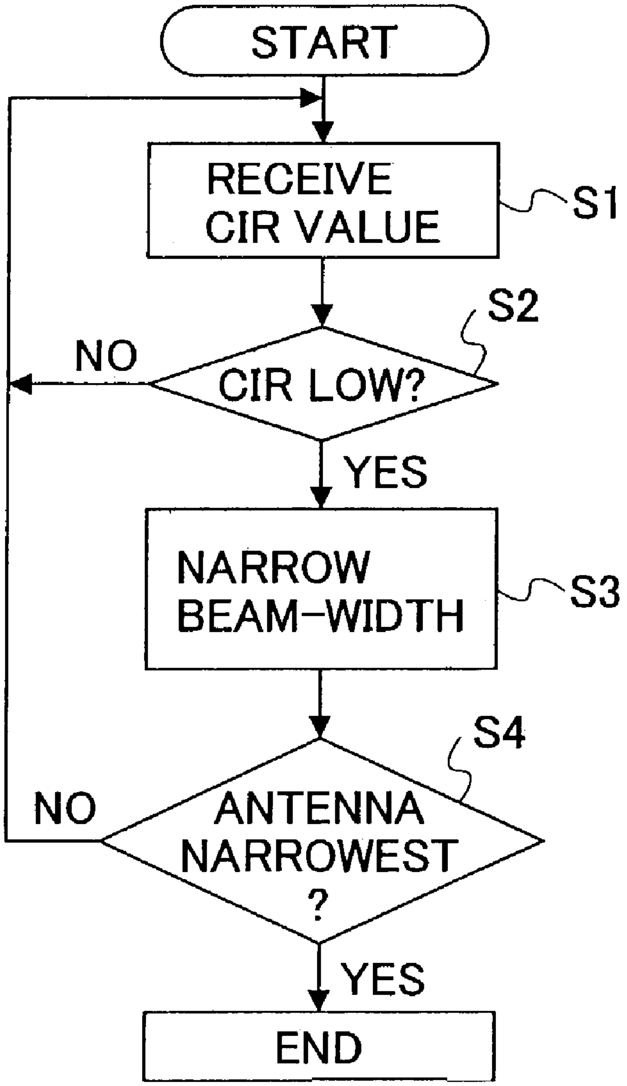
FIG. 6 is a flowchart showing a process of controlling the beam-width of an antenna in accordance with a first embodiment of the present invention.

A first embodiment of controlling method or process according to the present invention is explained with reference to a flow chart shown in FIG. 6. First, the beam-width controller 59 receives the CIR value from the CIR measuring device 58 (S1). It is determined whether the received CIR value is lower than a predetermined threshold or not (S2). If the CIR value is lower than the threshold, which means that the quality of reception is not so good, then the beam-width of the antenna is narrowed (S3) to weaken the influence of the interference waves. After the beam-width of the antenna has been narrowed, it is determined whether the narrowed beam-width reaches the minimum beam-width of the antenna or not (S4). If it reaches the minimum beam-width, then the narrowing process is completed. If it has not yet reached the minimum beam-width, then the process returns to the starting point.

At the step S2, if the CIR value is higher than the threshold, which means that the quality of reception is good enough, then the beam-width does not have to be narrowed more and the process returns to the starting point without doing anything further.

Figure 7:
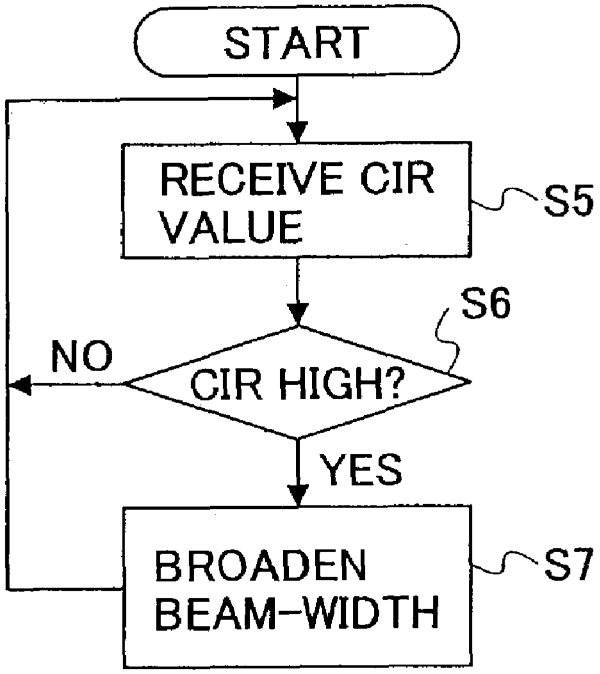
FIG. 7 is a flowchart showing a process of controlling the beam-width of an antenna in accordance with a second embodiment of the present invention.

Next, a second embodiment of controlling method or process according to the present invention is explained with reference to a flow chart shown in FIG. 7. First, the beam-width controller 59 receives the CIR value from the CIR measuring device 58 (S5). It is determined whether the received CIR value is higher than a predetermined threshold or not (S6). If the CIR value is higher than the threshold, which means that the quality of reception is good enough, then the beam-width of the antenna is broadened (S7). Although not shown, it may be determined whether the broadened beam-width reaches the maximum beam-width of the antenna. In that case, if it reaches the maximum angle, the broadening process may be completed.

If the CIR value is lower than the threshold (S6), which means that the quality of reception is not so good, then the beam-width of the antenna does not have to be broadened more and the process returns to the starting point.

Figure 8:
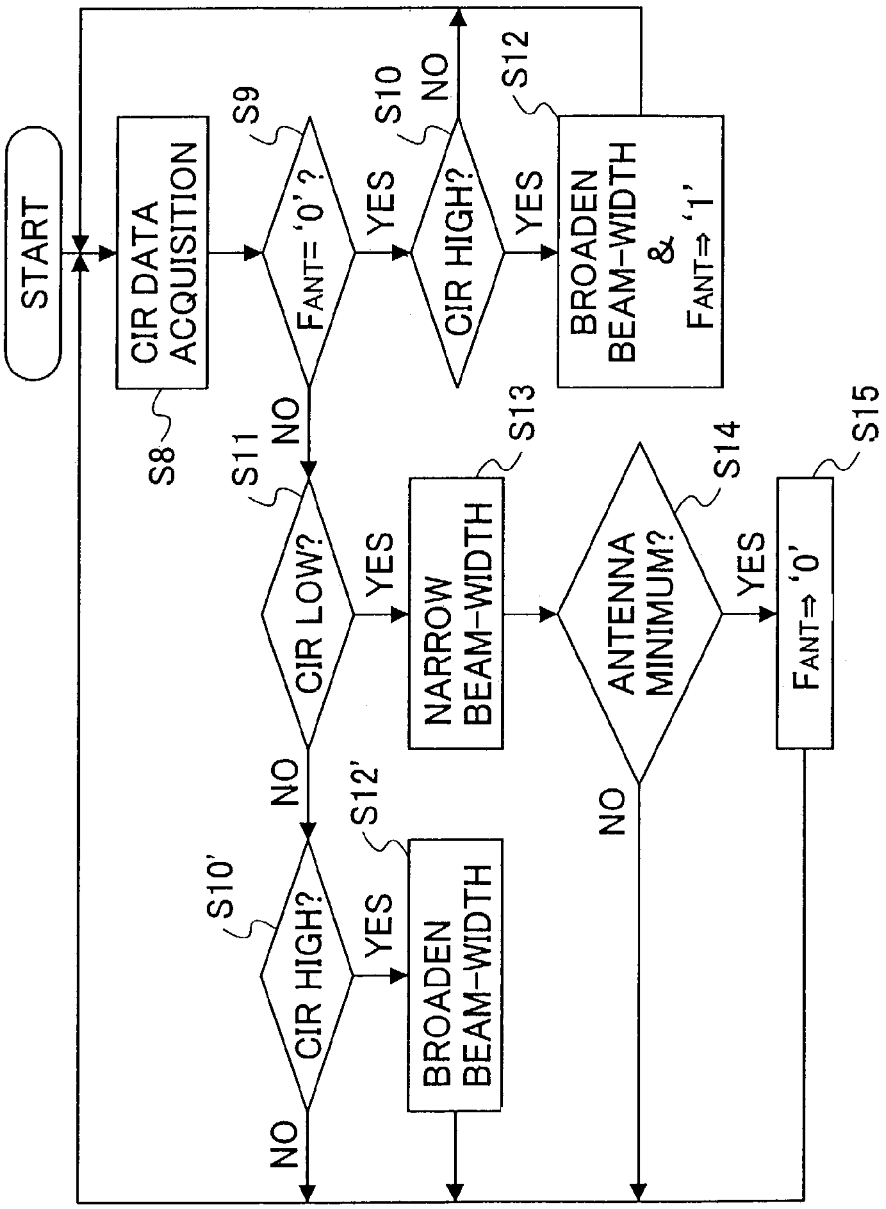
FIG. 8 is a flowchart showing a process of controlling the beam-width of an antenna in accordance with a third embodiment of the present invention.

A third embodiment of a sophisticated controlling method or process that is a combination of the first and second controlling processes is explained with reference to a flow chart shown in FIG. 8. First, the beam-width controller 59 receives the CIR value from the CIR measuring device 58 (S8). It is determined whether the beam-width of the antenna is the minimum angle or not (S9). If it reaches the minimum angle (that is, if $F_{ANT}=0$), the process goes to step 10, where it is determined whether the CIR value is higher than a first predetermined threshold or not (S10). If it is determined that the CIR value is higher than the first threshold, then the beam-width of the antenna is broadened (S12), an antenna minimum flag ($F_{ANT}$) is set as "1" (meaning "not minimum") and the process returns to the starting point. At step 10, if it is determined that the CIR value is not higher than the first threshold, the process goes back to the starting point without controlling the beam-width of the antenna.

At step S9, if it is determined that the beam-width of the antenna has not reached the minimum angle, the process goes to step S11, where it is determined whether the CIR value is lower than a second predetermined threshold or not. If it is determined that the CIR value is lower than the second threshold, the beam-width of the antenna is narrowed (S13). After narrowing the beam-width, it is determined whether the narrowed angle is the minimum beam-width of the antenna or not (S14). If it is the minimum, $F_{ANT}$ is set to "0" and the process goes back to the starting point. If it is not the minimum, the process immediately returns to the starting point without doing anything further.

At step S11, if the CIR value is not lower than the second predetermined threshold, the process goes to step S10', where the same procedures or operations as that done at steps 10 and 12 are performed, provided that $F_{ANT}$ is kept unchanged since the value of $F_{ANT}$ is already "1". These sequential operations can be repeatedly performed so that the beam-width of the antenna is kept as being the optimum situation. The second predetermined threshold at step S11 may be the same value as the first predetermined threshold at steps S10 and S10'. Alternatively, the second threshold at the step S11 may be lower than the first predetermined threshold at the steps S10 and S10' so that the number of the change in the directivity of the antenna can be minimized.

In the embodiments explained above, CIR is used as an example. The present invention, however, is not limited to CIR but can utilize another reception quality metric or factor such as Signal-to-Interference Ratio, etc., to control the beam-width.

In this Specification and claims, the word "interference wave" includes any radio waves coming from other base stations out of communication, from mobile stations and other radio wave sources, reflected waves, and any other radio waves, noises and other.

According to the above explained examples of the present invention, interference waves coming from directions other than the desired direction can be suppressed. Strong interference waves coming from the direction of the directivity of the antenna remain, but these strong waves are limited in number and therefore can be suppressed by a realistically sized interference canceller.

By combining an interference canceller and a beam-width-variable antenna whose beam-width is controlled depending on its CIR value, enough interference reduction can be obtained even if the lowermost beam-width of the antenna is not so small. A simple antenna whose beam-width is controllable depending on its CIR value makes the controlling operation simpler and easier, compared with complex antennas such as an adaptive array antenna.

A radio receiver having a small circuit scale but obtaining high interference suppressing effect can be provided in accordance with the present invention. It is not necessary for the radio receiver to make its beam-width extremely narrow, and therefore it became easier to autonomously establish communication links.

Further, the present invention is not limited to these embodiments and examples, but various variations and modifications may be made without departing from the scope of the present invention.

The present application is based on Japanese priority application No. 2002-039236 filed on Feb. 15, 2002 with the Japanese Patent Office, the entire contents of which are hereby incorporated by reference.

What is claimed is:

1. A radio receiver comprising:

a beam-width-variable antenna that receives a radio signal and is capable of changing a beam-width thereof;

an interference canceller configured to remove interference waves from the received radio signal and outputting an interference-wave-removed signal;

a measuring device configured to measure reception quality of the received signal based on the interference-wave-removed signal; and a beam-width controller configured to control the beam-width of the beam-width variable antenna based on the reception quality received from the measuring device.

2. A radio receiver as claimed in claim 1, wherein the reception quality is determined by a carrier-to-interference ratio (CIR).

3. The radio receiver as claimed in claim 1, wherein the reception quality is determined by a received-signal-to-interference ratio.

4. The radio receiver as claimed in claim 1, wherein the beam-width controller narrows the beam-width of the antenna when the reception quality is lower than a predetermined threshold.

5. The radio receiver as claimed in claim 1, wherein the beam-width controller broadens the beam-width of the antenna when the reception quality is higher than a predetermined threshold.

6. The radio receiver as claimed in claim 1, wherein the beam-width controller narrows the beam-width of the antenna when the reception quality is lower than a first predetermined threshold, and broadens the beam-width of the antenna when the reception quality is higher than a second predetermined threshold that is larger than the first predetermined threshold.

7. A base station comprising:

a beam-width-variable antenna that receives a radio signal and is capable of changing a beam-width thereof;

an interference canceller configured to remove interference waves from the received radio signal and outputting an interference-wave-removed signal;

a measuring device configured to measure reception quality of the received signal based on the interference-wave-removed signal; and a beam-width controller configured to control the beam-width of the beam-width variable antenna based on the reception quality received from the measuring device, wherein a base station employing the receiver is configured to communicate with a plurality of other base stations at the same time.

8. A mobile communication system comprising a beam-width-variable antenna that receives a radio signal and is capable of changing a beam-width thereof;

an interference canceller configured to remove interference waves from the received radio signal and outputting an interference-wave-removed signal;

a measuring device configured to measure reception quality of the received signal based on the interference-wave-removed signal; and a beam-width controller configured to control the beam-width of the beam-width variable antenna based on the reception quality received from the measuring device, wherein a base station employing the receiver is configured to communicate with a plurality of other base stations at the same time, and is configured to establish a radio entrance network between the base stations.

9. A radio receiving method, comprising the steps of:

receiving a radio signal using a beam-width-variable antenna capable of changing a beam-width thereof;

removing interference waves from the received radio signal and outputting an interference-wave-removed signal;

measuring reception quality of the received signal based on the interference-wave-removed signal; and controlling the beam-width of the beam-width-variable antenna based on the measured reception quality.

10. The radio receiving method as claimed in claim 9, wherein the reception quality is determined by a carrier-to-interference radio (CIR).

11. The radio receiving method as claimed in claim 9, wherein the reception quality is determined by a received-signal-to-interference ratio.

12. The radio receiving method as claimed in claim 9, wherein the controlling step narrows the beam-width of the antenna when the reception quality is lower than a predetermined threshold.

13. The radio receiving method as claimed in claim 9, wherein the controlling step broadens the beam-width of the antenna when the reception quality is higher than a predetermined threshold.

14. The radio receiving method as claimed in claim 9, wherein the controlling step narrows the beam-width of the antenna when the reception quality is lower than a first predetermined threshold, and broadens the beam-width of the antenna when the reception quality is higher than a second predetermined threshold that is larger than the first predetermined threshold.

* * * * *